(12) United States Patent
Ueno et al.

(10) Patent No.: US 7,941,128 B2
(45) Date of Patent: *May 10, 2011

(54) DATA BACKUP SYSTEM

(75) Inventors: Hidetoshi Ueno, Yokosuka (JP);
Kentaro Kakami, Yokosuka (JP);
Kimihiko Sekino, Tokyo (JP); Shoichi Horiguchi, Yokohama (JP); Hideharu Suzuki, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 727 days.

This patent is subject to a terminal disclaimer.

(21) Appl. No.: 11/914,304

(22) PCT Filed: May 10, 2006

(86) PCT No.: PCT/JP2006/309401
§ 371 (c)(1),
(2), (4) Date: Jan. 11, 2008

(87) PCT Pub. No.: WO2006/121077
PCT Pub. Date: Nov. 16, 2006

(65) Prior Publication Data
US 2009/0081998 A1   Mar. 26, 2009

(30) Foreign Application Priority Data
May 13, 2005   (JP) ................................. 2005-141925

(51) Int. Cl.
*H04L 29/06*   (2006.01)
(52) U.S. Cl. .................................................. 455/414.3
(58) Field of Classification Search .................. 455/41.2, 455/414.3, 33.1, 411; 370/331, 468, 338, 370/60
See application file for complete search history.

(56) References Cited

U.S. PATENT DOCUMENTS

| 2003/0074569 | A1 | 4/2003 | Yamauchi et al. | |
| 2004/0204070 | A1 | 10/2004 | August et al. | |
| 2005/0220054 | A1* | 10/2005 | Meier et al. | 370/331 |
| 2007/0291790 | A1* | 12/2007 | Ue et al. | 370/468 |
| 2008/0014869 | A1* | 1/2008 | Demirbasa et al. | 455/41.2 |

FOREIGN PATENT DOCUMENTS

EP   1 213 937 A2   6/2002

(Continued)

*Primary Examiner* — Melody Mehrpour
(74) *Attorney, Agent, or Firm* — Oblon, Spivak, McClelland, Maier & Neustadt, L.L.P.

(57) ABSTRACT

A data backup system includes a mobile device, a data storing apparatus for backup-saving user data used in the mobile device, and a user management apparatus for managing user information about a user using the mobile device, where the device and apparatuses communicate with each other. When the mobile device is a replacement for an old mobile device, the user management apparatus stores and manages a device ID of the mobile device in association with an old device ID of the old mobile device and personal identification information of a user using the mobile device and who has used the old mobile device. When downloading old user data previously used in the old mobile device from the data storing apparatus, the mobile device creates and transmits a user data acquiring request message with an old device user data acquiring request flag activated to the data storing apparatus. If the flag is set in the user data acquiring request message, the data storing apparatus verifies identification of the user with respect to the user management apparatus. If the identification of the user of the mobile device and the old mobile device is verified, the data storing apparatus retrieves and transmits the old user data to the mobile device.

6 Claims, 8 Drawing Sheets

FOREIGN PATENT DOCUMENTS

| | | |
|---|---|---|
| EP | 1 213 937 A3 | 6/2002 |
| JP | 2002 112314 | 4/2002 |
| JP | 2002 185579 | 6/2002 |
| JP | 2003 218782 | 7/2003 |
| JP | 2004 48180 | 2/2004 |
| JP | 2004 200845 | 7/2004 |

* cited by examiner

FIG.6

| Device ID Type | cellular Phone ID |
|---|---|
| Device ID | 0123456789 |
| Full Name | YAMADA, Taro |
| Date of Birth | May 14, 1974 |
| Domicile Address | xxxxxxx, Minato-ku, Tokyo |
| Fingerprint Info | (binary value) |

FIG.7

| Device ID Type | cellular phone ID | |
|---|---|---|
| Device ID | 0123456789 | |
| Data ID | Urn:docomo.imode.1234567 | ⎫ |
| Content Type | Image/jpeg | ⎬ USER DATA |
| Data Size | 93,123 bytes | ⎬ |
| Data Creation Date | 14 Mar 2005 16:18:10+0900 | ⎬ |
| Data | (binary) | ⎭ |

FIG.8

| Device ID Type | cellular Phone ID |
|---|---|
| Device ID (New Device) | 0102020202 |
| Device ID Type | cellular Phone ID |
| Device ID (Old Device) | 0123456789 |
| Full Name | YAMADA, Taro |
| Date of Birth | May 14, 1974 |
| Domicile Address | xxxxxxx, Minato-ku, Tokyo |
| Fingerprint Info | (binary value) |

FIG.9

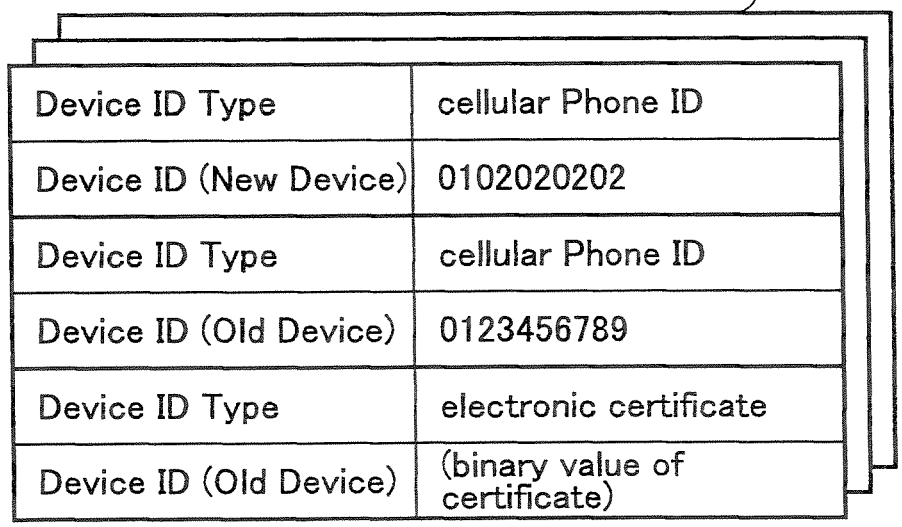

| Device ID Type | cellular Phone ID |
|---|---|
| Device ID (New Device) | 0102020202 |
| Device ID Type | cellular Phone ID |
| Device ID (Old Device) | 0123456789 |
| Device ID Type | electronic certificate |
| Device ID (Old Device) | (binary value of certificate) |

FIG.10

| Device ID Type | cellular Phone ID |
| --- | --- |
| Device ID | 0102020202 |
| Data ID | urn:docomo:imode.1234567 |
| FLAG (Old Device User Data Acquiring Request) | YES |

501

DATA BACKUP SYSTEM

FIELD OF THE INVENTION

The present invention relates to a data backup technique for storing data of a mobile device in a data backup apparatus on a network and allowing a new mobile device to download and continuously use the data even if the old mobile device is replaced with the new one.

BACKGROUND ART

It has become very common to download contents from a network for use in a mobile device such as a cellular phone or personal digital assistant (PDA). Various types of contents, including game applications, moving pictures and/or video images, wallpapers, and ringing melodies, can be downloaded. In addition, private data such as schedules or telephone directories can be created in mobile devices.

Downloaded contents and/or created data (collectively referred to simply as "data" or "user data") are stored in the memory of an individual mobile device. If the mobile device is lost or broken, such contents and/or data stored in the mobile device cannot be used in a new mobile device. If the user wants to continuously use content having been downloaded in the lost or broken mobile device, the same content has to be acquired again. In many cases, an extra fee is required to re-download the same content, and such inconvenience impairs user-friendliness. A more serious problem is that the data created in a mobile device cannot be completely re-created.

To deal with these problems, a data management service system for cellular phones is proposed (see, for example, Patent Document 1 listed below). In the data management service system, the data used in a mobile device are backed up in the system to solve the inconvenient problem that the data having been used in the mobile device cannot be continuously used in a new device upon replacement of the mobile device. The user data for use in the mobile device are uploaded in a data management server on the network, and desired data are downloaded in the mobile device from the server as necessary. Accordingly, the contents or private data can be continuously used even if the mobile device is replaced with a new one.

With this data management service system, not only the data freely used in the mobile device, but also copyright-protected data can be backed up in the system. Data items furnished with creators' (or copyright owners') ID information are stored in a copyright-protected area in the server, and restricted to be moved to other memory areas. Downloading of each of the data items in the copyright-protected area is permitted only for authorized mobile device(s) that are managed in association with that data item.

Another known technique is a contents backup method (see, for example, Patent Document 2 listed below). When copyright-protected content is delivered, a backup server is designated, which server is authorized in advance as a content backup site. The delivered content is authorized to be backed up only in the designated backup server.
[Patent Document 1] JP (Kokai) 2004-200845 A
[Patent Document 2] JP (Kokai) 2004-48180 A

SUMMARY OF INVENTION

Problem to be Solved by the Invention

In the conventional data management/backup techniques, each of mobile devices accessing the backup server is identified under the identifier of that mobile device. When a mobile device is replaced with a new one, the data stored in the backup server can be downloaded into the new device as long as the identifiers of the old device and the new device are the same, in a theoretical sense.

However, in reality, the identifiers of the mobile devices before and after the replacement are very often different from each other. For example, if the mobile device is a cellular phone, its identifier (ID number) is the telephone number, which is generally changed to a different number when the cellular phone is replaced with a new one.

A subscriber identity module (SIM) may be used to store a subscriber ID; however, the SIM is to be replaced to a new one when the cellular phone is lost and the telephone number is changed to a new number. Along with the replacement of the SIM, the SIM ID number and the international mobile subscriber identity (IMSI) number are also changed.

If an electronic certificate is used as the ID information of a mobile terminal, the serial number of the electronic certificate or the electronic certificate itself is changed.

In the above-described Patent Document 1, when a user replaces the cellular phone with a new one, a previously used password is input through the new mobile phone to the server. The server searches for a password consistent with the user's input in the user area, and if found, the ID number of the old cellular phone registered in association with the password is updated to the ID number of the new cellular phone. In order to prevent frequent change or illegal access, an access log record is created and managed, but the possibility of misuse of passwords cannot be denied. In addition, ID information of the old cellular phone is overwritten and deleted.

In Patent Document 2, user data are backed up only in the backup server designated in advance by the content delivering server for copyright protection of contents. However, this publication does not disclose a concrete and tangible method how to specify a user, how to search for the requested backup data, and how to allow the mobile terminal to download the backup data.

Accordingly, it is an object of the invention to provide a system and a method for properly and efficiently downloading previously used copyright-protected contents from a backup server even if a mobile device is replaced with a new one.

Means for Solving the Problem

In one aspect of the invention, a data backup system includes a mobile device, a data storing apparatus configured to store user backup data uploaded from the mobile device, and a user management apparatus configured to manage user information of a user of the mobile device, in which the mobile device, the data storing apparatus, and the user management apparatus mutually communicate with each other. The user management apparatus is further configured to store new device ID information of the mobile device, in association with user identification information of the user and old device ID information of previously used old mobile device, when the mobile device is replaced for the old mobile device. The mobile device is configured to create and transmit a user data acquiring request message with an old device user data acquiring request flag activated when downloading user data previously used in the old mobile device. The data storing apparatus is configured to verify identification of the user with respect to the user management apparatus when the flag is set in the user data acquiring request message, retrieve the user data used in the old mobile device, and transmit the retrieved user data to the mobile device.

In the second aspect of the invention, a mobile device using digital content acquired through a network is provided. The mobile device includes:

(a) a data backup availability determination unit configured to determine whether backup saving is authorized for the acquired digital content;

(b) a transmission unit configured to transmit user data created from the digital content to a data storing server arranged in the network when the backup saving is authorized;

(c) a user information re-registration message creating unit configured to create a user information re-registration message for requesting re-registration of device ID information of the mobile device in association with old device ID information of a previously used old mobile device; and (d) a user data acquiring request message creating unit configured to create a user data acquiring request message for downloading the backup-saved user data from the data storing server with an old device user data acquiring request flag activated.

With this arrangement, backup saving of copyright-protected content can be realized, and even after replacement of the mobile device, backup data previously created in and backed up from the old mobile device can be downloaded efficiently.

In the third aspect of the invention, a backup apparatus for backing up user data used in a mobile device is provided. The backup apparatus includes:

(a) a user data storing unit configured to store the user data;

(b) a user information storing unit configured to manage personal identification information of a user of the mobile device in association with a device identifier of the mobile device and an old device identifier of an old mobile device used by the same user when the mobile device is replacement for the old mobile device;

(c) a determination unit configured to determine whether acquisition of old user data previously used in the old mobile device is instructed in a user data acquiring request transmitted from the mobile device; and (d) a verification unit configured to verify identification of the user using the mobile device and the old mobile device by referring to the user information storing unit if the acquisition of the old user data is instructed.

With this arrangement, user data containing copyright-protected content previously used in the old mobile device can be downloaded efficiently and properly, and continuously used in the new mobile device even if the mobile device is replaced.

Advantages of the Invention

Even if a mobile device is replaced with a new one, user data including copyright-protected contents previously used in the old mobile device are properly and efficiently downloaded, and can be continuously used in the new mobile device.

BRIEF DESCRIPTION OF THE DRAWINGS

FIG. 6 is an example of a user ID information registration message transmitted from a mobile device to the user management apparatus;

FIG. 7 is an example of a user data storing request message transmitted from a mobile device to the data storing apparatus;

FIG. 8 is an example of a user ID information re-registration message transmitted from a new mobile device after replacement;

FIG. 9 is an example of a user device list managed in the user management apparatus: and FIG. 10 is an example of a user data acquiring request message transmitted from a mobile device to the data storing apparatus.

DESCRIPTION OF SYMBOLS

Figure 1:
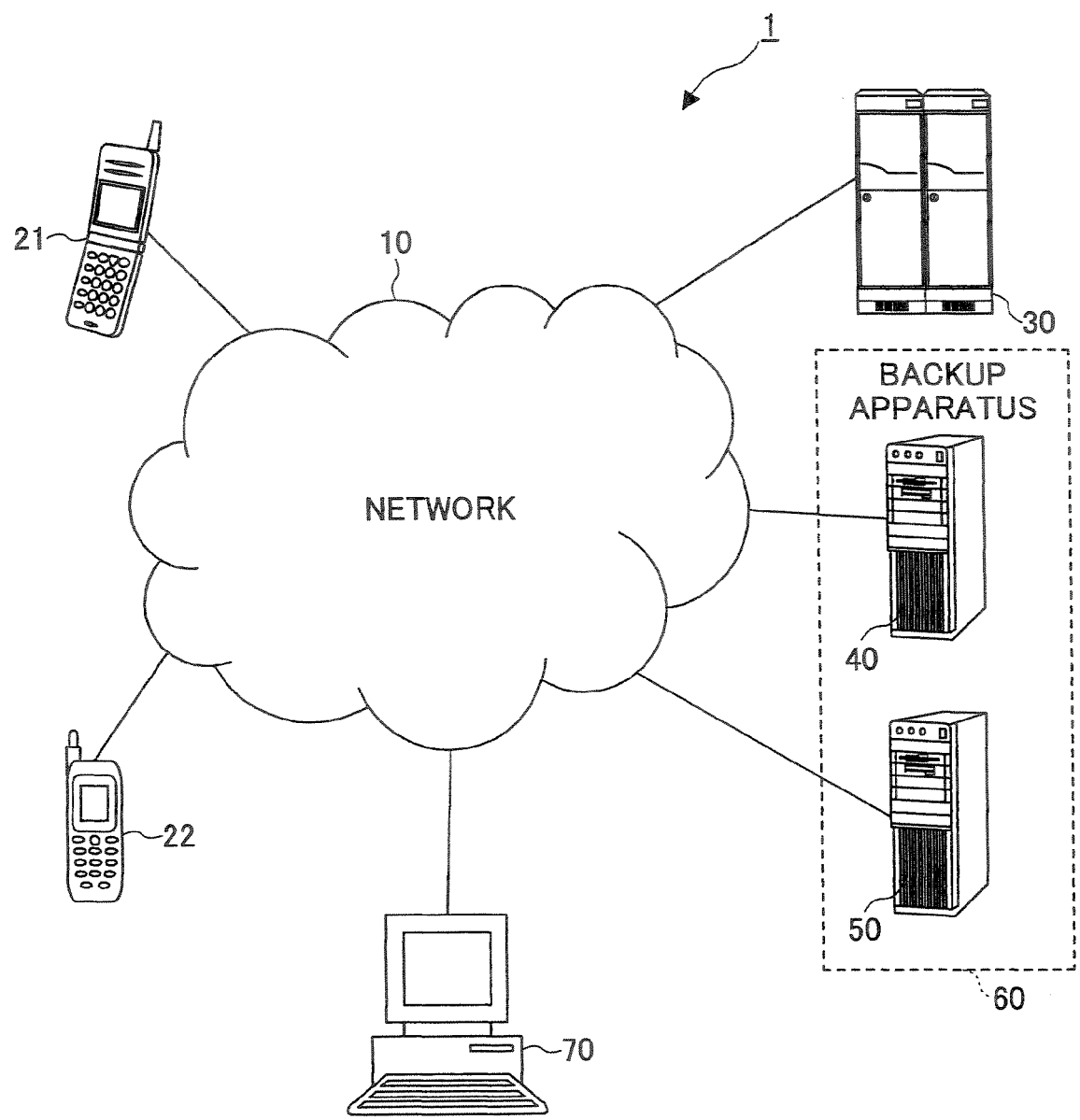
FIG. 1 is a schematic diagram of a data backup system according to an embodiment of the invention.

1: data backup system
21, 22: mobile device
30: content server apparatus
40: user management apparatus
50: data storing apparatus (data storing server)
60: backup apparatus
201: transmission unit
202: data backup availability determination unit
203: message creating unit
204: memory
301: old device user data acquiring request flag extraction unit (old device user data acquiring request determination unit)
302: device ID verification unit
303: user data storing unit
401: user ID information retrieving unit
402: user ID information storing/updating unit (user information storing unit)
405: user device list
501: old device user data acquiring request flag

BEST MODE TO CARRY OUT THE INVENTION

The preferred embodiments are now described below in conjunction with the attached drawings. In the figures referred to in the description below, the same elements are denoted by the same numerical symbols.

(Overall System Structure)

FIG. 1 is a schematic diagram of a data backup system according to an embodiment of the invention. The data backup system 1 includes mobile devices 21 and 22, a content server 30, a user management apparatus 40, a data storing apparatus 50, and information input station 70 which are connected to each other via a network 10. The user management apparatus 40 and the data storing apparatus 50 constitute a backup apparatus 60.

Each of the mobile devices 21 and 22, the content server 30, the user management apparatus 40, the data storing apparatus 50, and the information input station 70 has hardware resources including a CPU, memory/storage devices, and an input/output device, and software resources stored in the storage.

Figure 2:
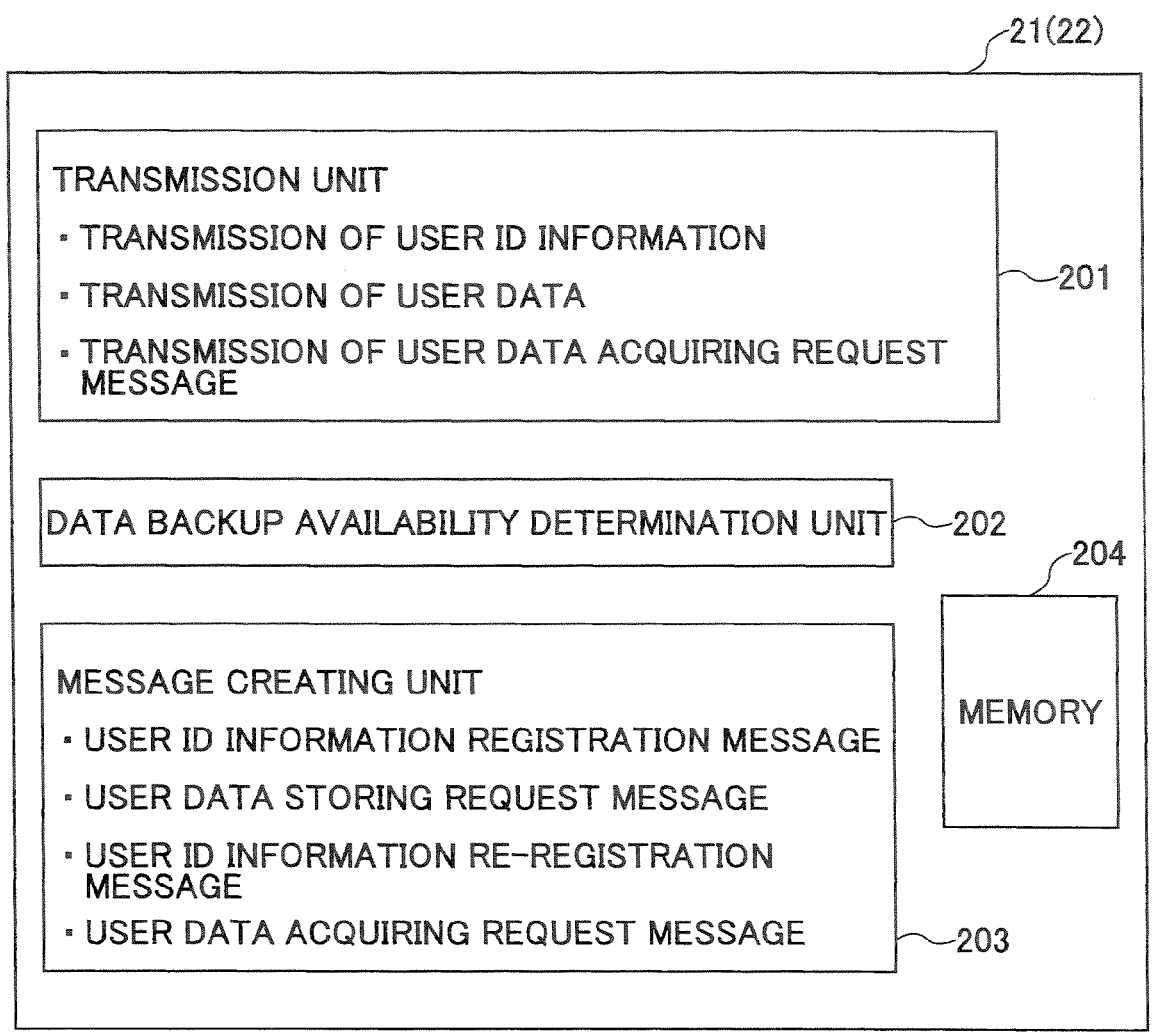
FIG. 2 is a schematic block diagram of a mobile device used in the system shown in FIG. 1.

FIG. 2 is a schematic block diagram illustrating the structure of the mobile device 21 (or 22). The mobile device 21 (or 22) has a transmission unit 201 for transmitting various messages to the user management apparatus 40 and the data storing apparatus 50 via the network 10, a message creating unit 203 for creating the messages to be transmitted, a data backup availability determination unit 202 for determining whether data backup saving is authorized for copyright-protected contents, and a memory 204 for storing data and applications.

When the mobile device 21 downloads copyright-protected content from the content server apparatus 30, the requested content is delivered with an information item indicating whether backup saving is authorized. The downloaded copyright-protected content is used in the mobile device with application software stored in the memory 204. To save the backup data of the content after the use, the data backup availability determination unit 202 determines whether backup saving in the data storing unit 50 is authorized for this content. If backup saving is authorized, backup data of the content (or user data) are transmitted to the data storing unit 50.

The message creating unit 203 creates a user ID information registration message, a user data storing request message, a user ID information re-registration message, a user data acquiring request message, and other messages.

The user ID information registration message is transmitted to register the mobile device 21 in the user management apparatus 40. The user ID information re-registration message is transmitted to re-register a new mobile device in the user management apparatus 40 when the previously used mobile device is replaced with the new one due to loss or malfunction. The user data storing request message is transmitted to the data storing apparatus 50 when requesting for backup saving of the user data having been used in the mobile device 21. The user data acquiring request message is transmitted to download the backup data from the data storing apparatus 50. In order to download the backup data having been used in the old mobile device in the new mobile device after replacement, the user data acquiring request message is created with an old device user data acquiring request flag, the details of which are described below.

Figure 3:
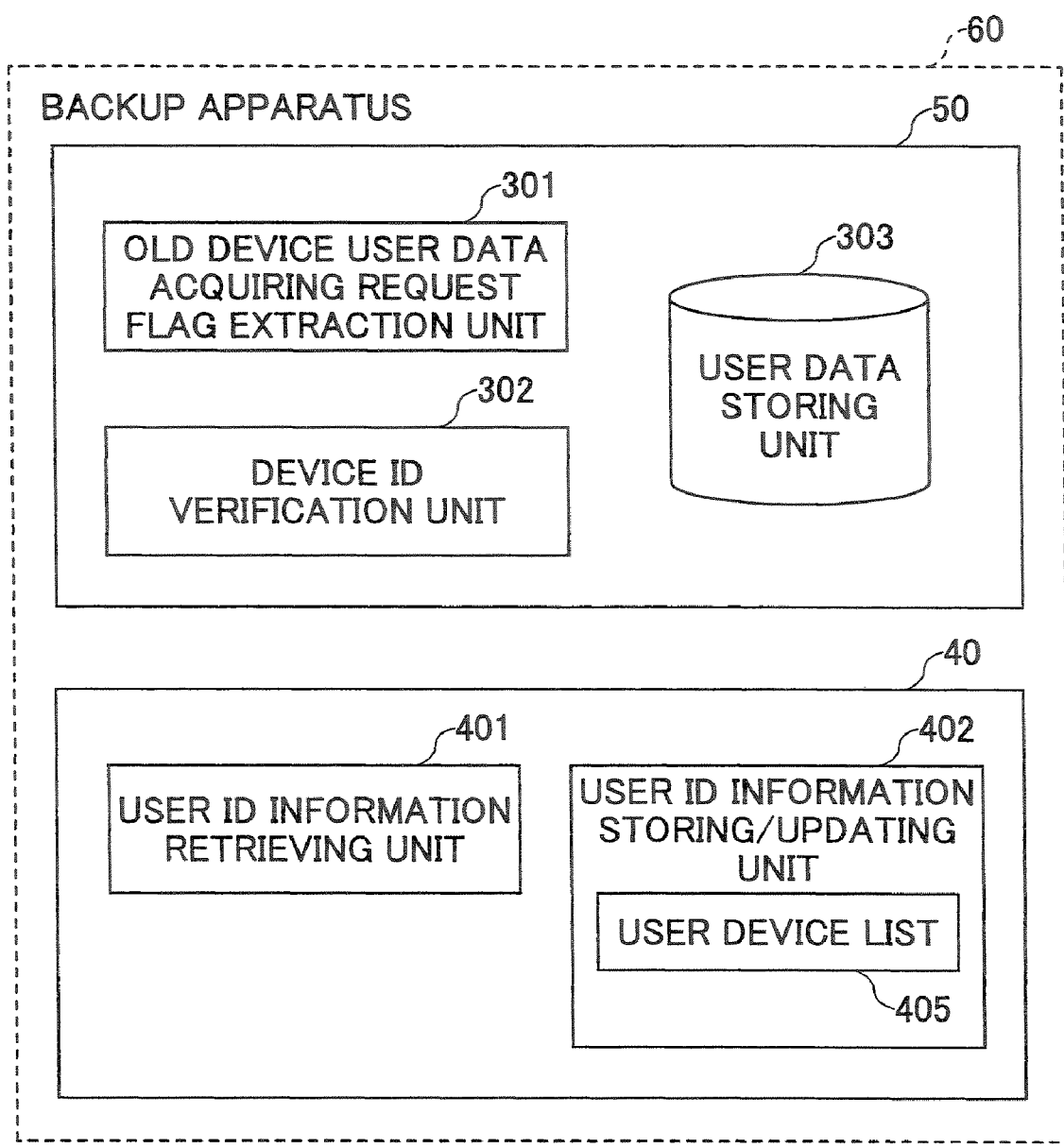
FIG. 3 is a schematic block diagram of a data backup apparatus used in the system shown in FIG. 1.

FIG. 3 is a schematic diagram of the backup apparatus 60. The backup apparatus 60 includes a data storing apparatus 50 and a user management apparatus 40. The data storing apparatus 50 has an old device user data acquiring request flag extraction unit 301, a device ID verification unit 302, and a user data storing unit 303 for storing user data upon requests from users.

The user data storing unit 303 stores backup data (user data) transmitted from a user's mobile device in a prescribed area. The old device user data acquiring request flag extraction unit 301 functions as a determination unit for determining whether a user data acquiring request flag, which represents a request for old device user data having been used in a user's old mobile device, is contained in the user data acquiring request message transmitted from the mobile device 21. If such a flag is not contained in the request message, requested user data are retrieved from the corresponding user area of the user data storing unit 303. If the flag (old device user data acquiring request flag) is contained in the user data acquiring request message, the device ID verification unit 302 carries out user verification with respect to the user management apparatus 40.

The user management apparatus 40 has a user ID information retrieving unit 401 and a user ID information storing/updating unit 402. The user ID information storing/updating unit 402 stores personal information of each user, and has a user device list 45 for listing mobile devices belonging to a same user, which list is used to specify the belongings of a user (or the identity of the user using the listed devices) when the user changes a mobile device. The user ID information retrieving unit 401 checks the user device list 405 of each of the users to verify that the old device has been used by the same user when receiving a user verification request from the data storing apparatus 50.

The data storing apparatus 50 and the user management apparatus 40 are not necessarily separated from each other, and they may be combined into a single unit to constitute a backup apparatus.

(Operations of Data Backup System)

Figure 4:
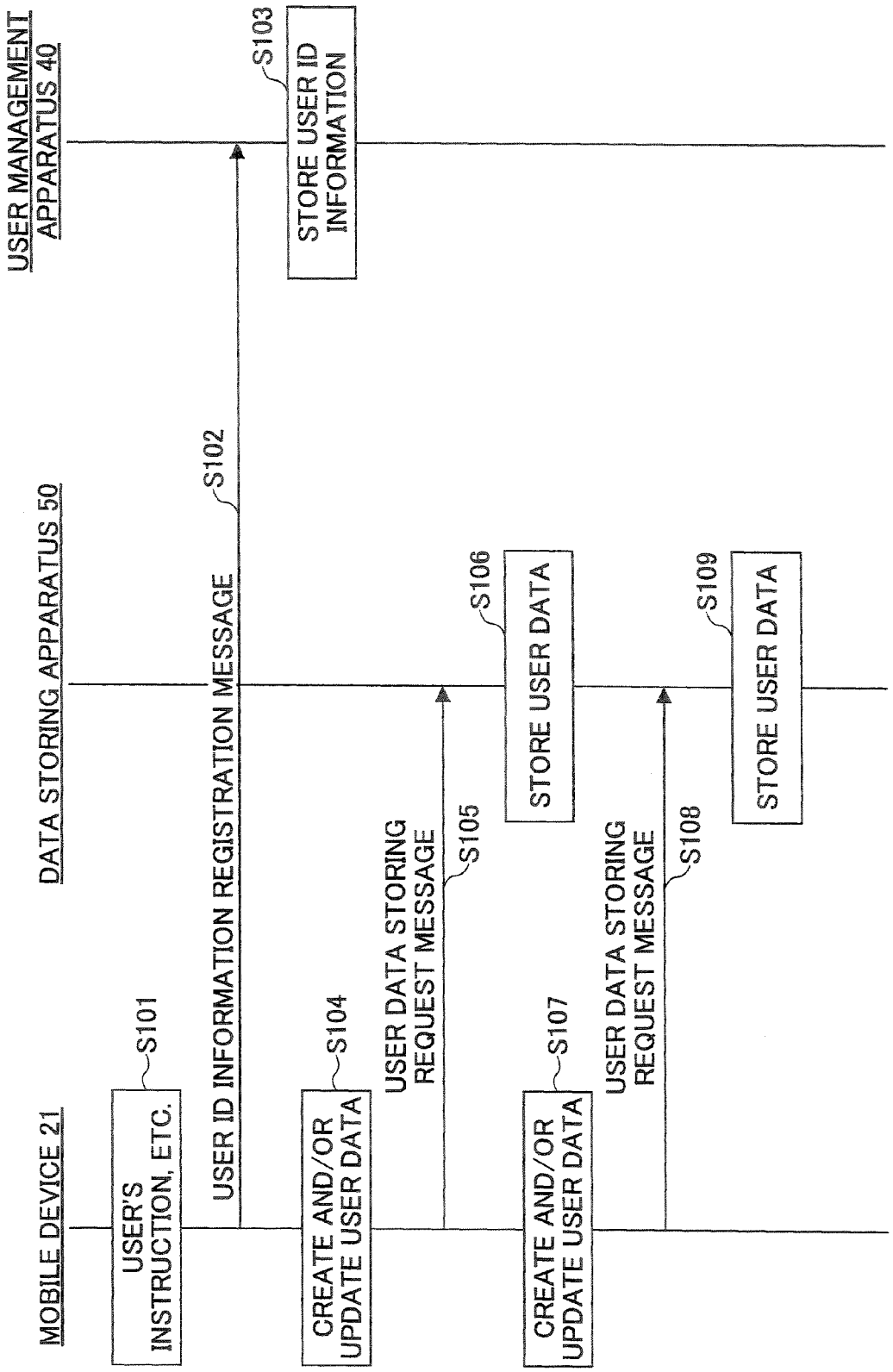
FIG. 4 is a sequence diagram showing the data storing procedure of the old mobile device in the system shown in FIG. 1.
Figure 5:
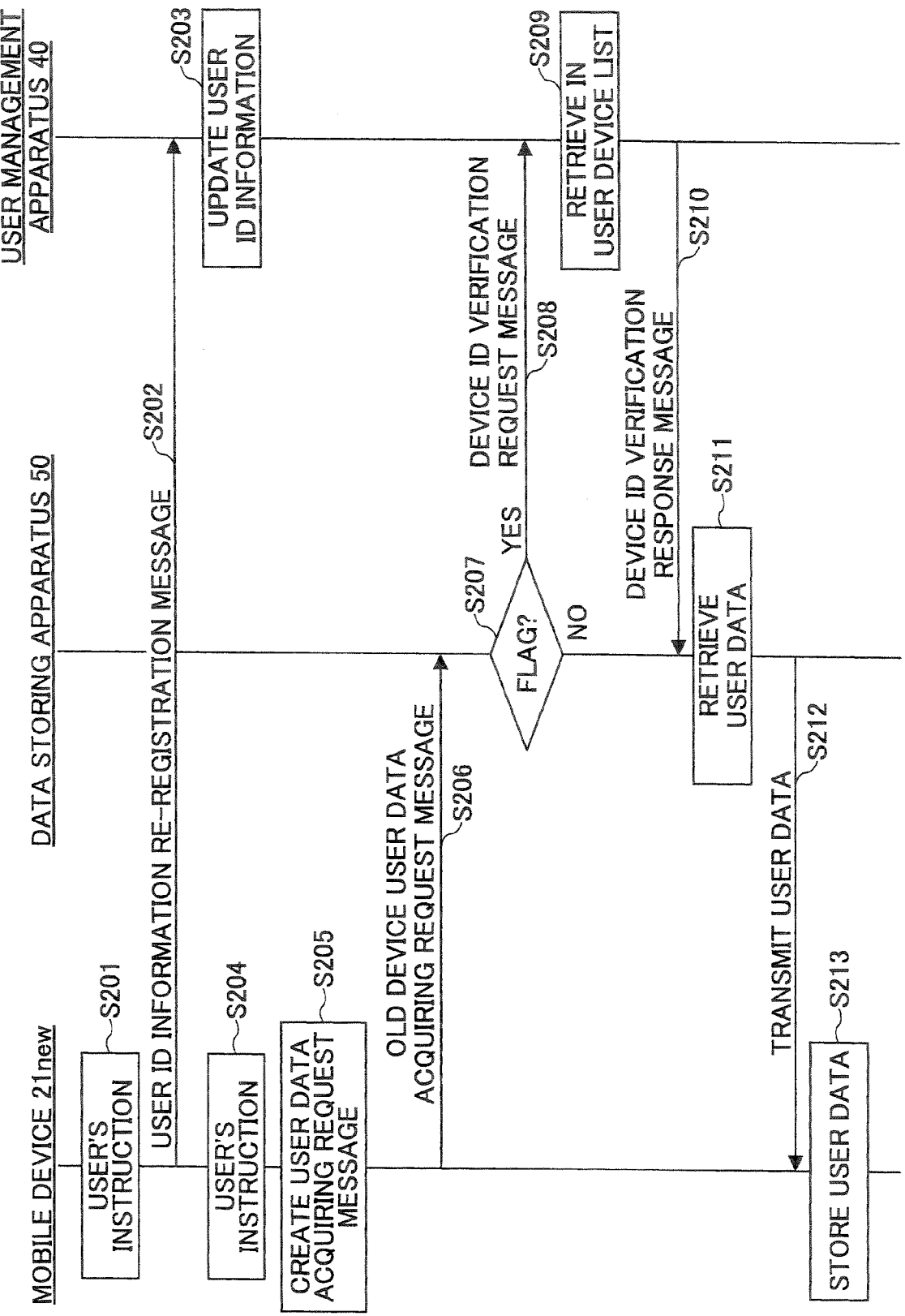
FIG. 5 is a sequence diagram showing the backup data acquiring procedure performed by the new mobile device after replacement in the system shown in FIG. 1.

Next, explanation is made of the overall sequence of operations of the data backup system 1 comprised of the above-described apparatuses, in conjunction with FIG. 4 and FIG. 5.

FIG. 4 is a sequence diagram showing the operations carried out when the mobile device 21 saves backup data.

(1) Registration of User ID Information

Upon a request or instruction from the user (S101), the mobile device 21 creates a user ID information registration message and transmits the message to the user management apparatus 40 (S102). The user ID information registration message contains a device identifier of the mobile device 21 and personal identification information of the user of the mobile device 21.

The device identifier is an information item unique to the mobile device 21, examples of which include IMSI, product ID, telephone number, and electronic certificate.

The personal identification information is information for specifying each user, and it may be any combination of user's name, age, telephone number, e-mail address, driver's license number, passport number, fingerprint information, photo of user's face, iris information, and palm vein information.

FIG. 6 is an example of the user ID information registration message. In this example, the user ID information registration message includes device ID information and personal identification information. The device ID type is, for example, the ID number of a cellular phone. The personal identification information includes, for example, the user's name, the date of birth, the domicile address, and the fingerprint information.

Returning to FIG. 4, upon receipt of the user ID information registration message from the mobile device 21, the user management apparatus 40 defines a certain area in the user ID information storing/updating unit 402 to save the user ID information (S103). The user ID information registration message may be transmitted from the information input station 70 (see FIG. 1) to the user management apparatus 40. For example, when a user purchases a cellular phone, his/her personal identification may be input and transmitted to the user management apparatus 40 via the information input station 80 in the shop. By designing the user management apparatus 40 so as to accept only those information items input through specifically designated information input stations 70, security of the device identifiers and personal identification information can be enhanced.

It is desired that the user ID information registration message be protected from eavesdropping by a third party. Accordingly, IP security (IPSec) or secure socket layer (SSL) may be employed for communications between the mobile device 21 and the user management apparatus 40, and between the information input station 70 and the user management apparatus 40 to encrypt the communications. Furthermore, it is necessary to establish a mutually secure relationship between the mobile device 21 and the user management apparatus 40 and between the information input station 70 and the user management apparatus 40, by performing, for example, mutual authentication. In this case, IPSec or SSL may be used for the mutual authentication, and/or a dedicated line may be used for the connection between the information input station 70 and the user management apparatus 40.

(2) Transmission of User Data Storing Request

Then, the mobile device 21 acquires various types of contents, such as game applications, moving pictures, wallpapers, or ringing melodies, from the content server apparatus 30, stores the acquired data in the memory 204, and uses them (S104). User data, such as schedule or telephone directory, created in the mobile device 21 are also stored in the memory 204. Other data stored in the mobile device 21 include meta data of content, such as rights object defined by Open Mobile Alliance Digital Rights Management Version 2.0 (OMA DEMv2), memory data such as scratch pad created during execution of Java (registered trademark) applications, and any data existing in the mobile device 21.

When various data are created, stored, and updated in the mobile device 21 (S104), a user data storing request message is transmitted to the data storing apparatus 50, which works as a part of the backup apparatus 60 (S105). The user data storing request message includes a device identifier (ID) and data to be backed up. The data contained in the user data storing request message and the annexed data are collectively referred to as "user data". The data storing apparatus 50 stores the user data contained in the user data storing request message, associated with the device ID (S106).

The user data storing request message may be created, transmitted to and stored in the data storing apparatus 50 every time data are updated in the mobile device 21 (S107, S108 and S109).

FIG. 7 is an example of the user data storing request message. In this example, the user data storing request message includes device ID information and user data. The user data may contain annexed information of the user data, such as data ID, type of content, data size, or data creation date.

It is desirable to protect the user data storing request message from eavesdropping by a third party, and accordingly, IP security (IPSec) or Secure Socket Layer (SSL) may be employed for encrypted communications between the mobile device 21 and the data storing apparatus 50. In addition, it is necessary to establish a mutually secure relationship between the mobile device 21 and the data storing apparatus 40, and IPSec or SSL may be used as the mutual authentication means.

(3) Re-Registration of User ID Information

FIG. 5 is a sequence diagram of the system operations performed when the mobile device 21 is lost or broken and replaced with a new mobile device $21_{new}$.

Upon an instruction or request from the user (S201), the new mobile device $21_{new}$ transmits a user ID information re-registration message (S202). The user ID information re-registration message includes the device identifier (ID) of the new mobile device $21_{new}$, the device identifier (ID) of the previously used mobile device 21, and the user's personal information.

FIG. 8 is an example of the user ID information re-registration message. In this example, the user's name, the date of birth, and the fingerprint information are included as user data, together with device IDs of the new mobile device and the previous mobile device, in the user personal information.

Returning to FIG. 5, when the user management apparatus 40 receives the user ID information re-registration message from the new mobile device $21_{new}$, the user ID information retrieving unit 401 (See FIG. 3) retrieves the information associated with the device ID of the old mobile device 21 in the user ID information storing/updating unit 402. If the target information associated with the old mobile device 21 is retrieved, the device ID of the new mobile device $21_{new}$ is added to update the user ID information based on the user ID information re-registration message (S203).

In S203, the user management apparatus 40 also creates a user device list 405 representing that the user of the new mobile device $21_{new}$ and the user of the old mobile device 21 are identical. The user device list 405 is created every time a new device ID is received, and the list includes the past record of the mobile devices having belonged to the user who requested re-registration of the new mobile device $21_{new}$.

FIG. 9 is an example of the user device list 405. In this example, the device ID of the currently used mobile device and the device ID of the old device used by this same user in the past are listed. Determination as to whether the old mobile device 21 and the new mobile device $21_{new}$ are used by the same user is made based on the user ID information stored in the user management apparatus 40. To be more precise, the user management apparatus 40 confirms the fact that the new mobile device $21_{new}$ and the old mobile device 21 are used by the same user only if the personal information contained in the user ID information re-registration message and the personal information stored in the user ID information storing/updating unit 402 agree with each other (for example, with the fingerprint information items being identical to each other).

The personal information is private information implying a problem of the possibility of spoofing or identity theft which may occur when the user tells another user about the personal information. To avoid this problem, the user ID information re-registration message may be transmitted from the information input station 70 to the user management apparatus 40. For example, when a new cellular phone is purchased by the user at a shop, personal information of the user is input and transmitted through the information input station 70 to the user management apparatus 40. It is preferable that the information input station 70 be accessible only by authorized operators, who make identity verification of the user by checking the driver's license number or the passport number to prevent spoofing or identity theft.

It is desired to protect the user ID information re-registration message from eavesdropping by a third party, and for this reason, IPSec (IP Security) or SSL (Secure Socket Layer) may be employed for encrypted communications between the mobile device 22 and the user management apparatus 40, and between the information input station 70 and the user management apparatus 40. In addition, it is necessary to establish a mutually secure relationship between the mobile devices 21 (and 22) and the user management apparatus 40, and between the information input station 70 and the user management apparatus 40, by conducting mutual authentication or other suitable means. In this case, IPSec or SSL may be employed for the mutual authentication, and/or a dedicated line may be used for the connection between the information input station 70 and the user management apparatus 40.

(4) Operations for User Data Acquiring Request

Upon an instruction from the user to acquire backup data (S204), the new mobile device $21_{new}$ creates a user data acquiring request message (S205), and transmits the created message to the data storing apparatus 50 (S206). The user data acquiring request message includes the device identifier of the new mobile device $21_{new}$ and data identifier requested by the user, as well as an old device user data acquiring request flag that represents whether user data uploaded from the old device 21 before the replacement is requested. The details of the flag are described below.

FIG. 10 is an example of the user data acquiring request message. In this example, the user data acquiring request message contains the device identifier, a data ID, and an old device user data acquiring request flag 501. Other information, such as the content type, the data size, and/or the data creation date may be included in this message.

It is desirable to protect the user data acquiring request message from eavesdropping by a third party, and therefore IPSec (IP Security) or SSL (Secure Socket Layer) may be employed for encrypted communications between the new mobile device $21_{new}$ and the data storing apparatus 50. It is also necessary to establish a mutually secure relationship between the new mobile device $21_{new}$ and the data storing apparatus 50, and the IPSec or SSL protocol may be used for the mutual authentication.

(5) Operations for Verification of Device Identifier

Upon receiving the user data acquiring request message at the data storing apparatus 50, the old device user data acquiring request flag extraction unit 301 determines whether the old device user data acquiring request flag 501 is set in the message (S207). If the old device user data acquiring request flag 501 is set, the device ID verification unit 302 transmits a device ID verification request message to the user management apparatus 40 (S208). In the device ID verification request message is contained the device ID of the new mobile device $21_{new}$ taken out of the user data acquiring request message.

Upon receiving the device ID verification request message from the data storing apparatus 50, the user management apparatus 40 retrieves and extracts a user device list 405 that has the same device ID as that contained in the device ID verification request message (S209).

When a user device list 405 having the device ID of the new mobile device $21_{new}$ is retrieved, the user management apparatus 40 transmits a device ID verification response message to the data storing apparatus 50 (S210). The device ID verification response message contains the user device list 405 managed in the user management apparatus 40, from which list the old device used by the same user before the replacement can be specified.

Upon receiving the verification response message from the user management apparatus 40, the data storing apparatus 50 searches for the user data in the user data storing unit 303 and retrieves the target user data from the memory area managed under the device ID of the old mobile device (S211). In this process, the data storing apparatus 50 searches for the requested user data under the device ID of the new mobile device $21_{new}$ contained in the user data acquiring request message and the device ID of the old mobile device 21 contained in the verification response message.

It is desirable to protect the device ID verification request message and the verification response message from eavesdropping by a third party, and therefore, IPSec (IP Security) or SSL (Secure Socket Layer) may be employed for encrypted communications between the data storing apparatus 50 and the user management apparatus 40. In addition, it is necessary to establish a mutually secure relationship between the data storing apparatus 50 and the user management apparatus 40 by conducting, for example, mutual authentication. In this case, mutual authentication using the IPSec or SSL protocol or a dedicated line for connecting between the data storing apparatus 50 and the user management apparatus 40 may be employed.

When existence of the requested user data has been confirmed, the data storing apparatus 50 transmits the user data to the new mobile device $21_{new}$ (S212). Device ID information of the mobile device 21 is attached to the transmitted user data. If the data storing apparatus 50 has both the backup user data uploaded from the old mobile device before the replacement and new backup data uploaded from the new mobile device $21_{new}$ after the replacement, the old and new backup data may be merged into the user data to be transmitted to the new mobile device $21_{new}$.

It is desirable to protect the transmitted user data from eavesdropping by a third party, and therefore, IPSec (IP Security) or SSL (Secure Socket Layer) may be used for encrypted communications between the data storing apparatus 50 and the new mobile device $21_{new}$. In addition, it is necessary to establish a mutually secure relationship between the data storing apparatus 50 and the new mobile device $21_{new}$ by conducting, for example, mutual authentication. In this case, IPSec or SSL may also be used for the mutual authentication.

(6) Operations Upon Acquisition of User Data

Upon receiving the user data from the data storing apparatus 50, the new mobile device $21_{new}$ determines whether to reflect the content of the acquired user data in the memory 204. It may be arranged such that only updated user data are reflected based on the user data ID information contained in the user data from the data storing apparatus 50 or the user data creation date, or alternatively, the acquisition of the user data may be displayed in the display panel to allow a user's instruction to be input. If it is determined that the acquired user data are to be stored in the mobile device, the user data are stored in the memory 204 (S213).

In this manner, when an old mobile device is replaced with a new one, the new mobile device $21_{new}$ creates a user data acquiring request message with an old device user data acquiring request flag activated, and attaches the device ID of the new mobile device $21_{new}$ itself. Consequently, the user data which have been previously used in the old mobile device 21 and backed up in the data storing apparatus 50 can be downloaded in a efficient and reliable manner, and continuously used in the new mobile device.

This international application is based upon and claims the benefit of the earlier filing date of Japanese Patent Application No. 2005-141925 filed May 13, 2005, the entire contents of which are hereby incorporated by reference.

What is claimed is:

1. A data backup system comprising:
   a mobile device;
   a data storing apparatus configured to store user backup data uploaded from the mobile device; and
   a user management apparatus configured to manage user information of a user of the mobile device, the mobile device, the data storing apparatus, and the user management apparatus being capable of mutually communicating with each other;
   wherein the user management apparatus is further configured to store new device ID information of the mobile device, in association with user identification information of the user and old device ID information of a previously used old mobile device, when the mobile device is a replacement for the old mobile device,
   wherein the mobile device is configured to create and transmit a user data acquiring request message with an old device user data acquiring request flag activated when downloading user data previously used in the old mobile device, the user data acquiring request message including new device ID information of the mobile device, and
   wherein the data storing apparatus is configured to verify identification of the user using the new device ID information included in the user data acquiring request message with respect to the user management apparatus when the flag is set in the user data acquiring request message, retrieve the user data used in the old mobile device if the identification of the user is verified, based on the old device ID information received from the user management apparatus, and transmit the retrieved user data to the mobile device.

2. A data backup method comprising the steps of:

at a mobile device, receiving digital content delivered from a network;

determining whether data backup saving is authorized for the digital content;

if the backup saving is authorized, storing user data created in the mobile device from the digital content in a data storing apparatus arranged in the network;

when the mobile device is replaced with a new mobile device, storing user ID information in which new device ID information of the new mobile device is associated with old device ID information of the replaced mobile device and personal identification information of a user having used the replaced mobile device and using the new mobile device;

transmitting a user data acquiring request message from the new mobile device with an old device user data acquiring request flag activated when downloading the user data of the replaced mobile device from the data storing apparatus, the user data acquiring request message including new device ID information of the mobile device;

at the data storing apparatus, verifying identification of the user using the new device ID information included in the user data acquiring request message when the flag is set in the user data acquiring request; and if the identification of the user is verified, based on old device ID information, transmitting the requested user data to the new mobile device from the data storing apparatus.

3. A mobile device using digital content acquired through a network, comprising:

a data backup availability determination unit configured to determine whether backup saving is authorized for the acquired digital content;

a transmission unit configured to transmit user data created from the digital content to a data storing server arranged in the network when the backup saving is authorized;

a user information re-registration message creating unit configured to create a user information re-registration message for requesting re-registration of device ID information of the mobile device, as new device ID information, in association with old device ID information of a previously used old mobile device; and a user data acquiring request message creating unit configured to create a user data acquiring request message for downloading backup-saved user data from the data storing server with an old device user data acquiring request flag activated, the user data acquiring request message including the new ID information of the mobile device.

4. The mobile device of claim 3, wherein the user information re-registration message creating unit is configured to create the re-registration message that includes personal identification information of a user of the mobile device in association with a device identifier of the mobile device and an old device identifier of the old mobile device.

5. A backup apparatus for backing up user data used in a mobile device, comprising:

a user data storing unit configured to store the user data;

a user information storing unit configured to manage personal identification information of a user of the mobile device in association with a device identifier of the mobile device, which is new device ID information, and an old device identifier of an old mobile device, which is old device ID information, used by the same user when the mobile device is a replacement for the old mobile device;

a determination unit configured to determine whether acquisition of old user data previously used in the old mobile device is instructed in a user data acquiring request message transmitted from the mobile device based on an old device user data acquiring request flag activated, the user data acquiring request message including the new device ID information of the mobile device; and a verification unit configured to verify identification of the user using the new device ID information included in the user data acquiring request message and the old device ID information by referring to the user information storing unit if the acquisition of the old user data is requested.

6. The backup apparatus of claim 5, further comprising:

a user identification information retrieving unit configured to retrieve user identification information in the user information storing unit to confirm the identification of the user when the verification of the user is required; and a transmission unit configured to transmit the old user data stored in the user data storing unit when the identification of the user is verified.

* * * * *